HIGH-DEFINITION TELEVISION SYSTEM AND METHOD

Filed Oct. 31, 1950 7 Sheets-Sheet 1

Inventor:
Robert B. Dome,
by Prowell S. Mack
His Attorney.

Aug. 17, 1954 R. B. DOME 2,686,831

HIGH-DEFINITION TELEVISION SYSTEM AND METHOD

Filed Oct. 31, 1950 7 Sheets-Sheet 2

Inventor:
Robert B. Dome,
by Brassell S. Mack
His Attorney.

Aug. 17, 1954 R. B. DOME 2,686,831

HIGH-DEFINITION TELEVISION SYSTEM AND METHOD

Filed Oct. 31, 1950 7 Sheets-Sheet 3

Inventor:
Robert B. Dome,
by Brewell & Mack
His Attorney.

HIGH-DEFINITION TELEVISION SYSTEM AND METHOD

Filed Oct. 31, 1950 7 Sheets-Sheet 4

Inventor:
Robert B. Dome,
by Prowell S. Mack
His Attorney.

HIGH-DEFINITION TELEVISION SYSTEM AND METHOD

Inventor:
Robert B. Dome,
by Prancell S. Mack
His Attorney.

Inventor:
Robert B. Dome,
by Brownell S. Mack
His Attorney.

Aug. 17, 1954 R. B. DOME 2,686,831

HIGH-DEFINITION TELEVISION SYSTEM AND METHOD

Filed Oct. 31, 1950 7 Sheets-Sheet 7

Inventor:
Robert B. Dome,
by Brovell S. Mack
His Attorney.

Patented Aug. 17, 1954 2,686,831

UNITED STATES PATENT OFFICE 2,686,831

HIGH-DEFINITION TELEVISION SYSTEM AND METHOD

Robert B. Dome, Syracuse, N. Y., assignor to General Electric Company, a corporation of New York Application October 31, 1950, Serial No. 193,164

21 Claims. (Cl. 178—6.8)

My invention relates to new and improved systems and methods for transmitting and receiving television picture signals, and is particularly directed to the transmission and reception of a wider range of picture signal components, within a specified channel bandwidth, than has heretofore been achieved in television broadcasting practice. By applying the principles of my invention, it is possible for a black-and-white, or monochrome, picture image to be transmitted and reproduced, within present-day standards of transmission, with substantially increased picture detail; or for a colored picture image to be transmitted and reproduced within the same bandwidth, with a definition and quality comparable to present-day monochrome images.

According to current television broadcasting standards in the United States for monochrome picture transmisison, the televised scene is sequentially scanned from left to right and from top to bottom in a series of narrow horizontal lines, in a manner analogous to the way the eye of a reader scans a page of printed material. Each complete scan of the scene to be transmitted, or picture frame, requires the scanning spot to traverse 525 horizontal scanning lines across the scene within 1/30 of a second. To reduce flicker, double interlace is employed, that is, 262½ "odd lines" are first scanned within 1/60 of a second, constituting one picture field, and the remaining 262½ "even lines" are scanned during the next picture field to complete the frame. Thus the horizontal scanning rate is 15,750 lines per second and the vertical scanning rate is 60 fields per second. As is well known to those skilled in the art, various blanking and synchronizing pulses are also inserted at these same rates at the ends of the scanning lines and picture fields.

The composite television picture signal, as above described, is modulated upon a picture carrier wave, and any accompanying sound signals are modulated upon a second carrier wave spaced 4.5 megacycles per second above the picture carrier. The two carriers and their side band components are required to be transmitted within a channel having a total bandwidth of 6 megacycles per second, approximately 4.75 mc. p. s. being devoted to the transmission of the picture signal components. By employing unsymmetrical, or vestigial, transmission of the picture signal side bands, a total range of picture signal components up to about 4 mc. p. s. can be transmitted.

The picture definition, or degree of image detail, which can be reproduced at the receiver is limited by the maximum video frequency which can be transmitted between the television camera tube in the transmitter and the picture signal tube in the receiver. Even though the camera tube is generally capable of reproducing much higher frequencies, the limitation to about 4 mc. p. s. bandwidth in the transmission channel now limits the detail in the reproduced picture image in the horizontal direction to the equivalent of that produced by about 300 scanning lines.

By employing the special picture signal of my invention, an increase in horizontal resolution of the order of 50% can be achieved without increasing the video bandwidth. While these benefits can only be realized by receiving the special picture signal of my invention in a television receiver which is particularly designed for the purpose, the system can also be made fully compatible with the system currently in commercial use in the United States. That is, it is still possible for a conventional monochrome receiver to reproduce a satisfactory black-and-white signal in response to receipt of the special television signal of my invention, and with a degree of picture resolution not substantially inferior to that provided by a conventional signal. This is a very important consideration because of the tremendous investments which have been made in television transmitters and in television broadcast receivers within the past few years. The adoption of the systems and methods of my invention will not render this existing equipment obsolete, but will enable the owners of conventional television receivers either to continue the use of their present equipment, or to enjoy better quality pictures by investing in improved receivers embodying the present invention.

By a simple modification, my invention also lends itself to the transmisison and reception of television images in natural colors. While no final standards of transmission have yet been established in the United States as of this date, my improved color television system and method are also fully compatible with the so-called "field sequential" type of color transmission, in which interlaced picture fields are sequentially transmitted in the three component primary colors (i. e., green, red-orange and blue-violet). The details of such an improved color television system and method will appear more fully in the detailed description at a later point in this specification.

Very briefly, an important distinguishing feature of the present invention, as compared to prior art systems and methods, is the unique treatment of fine detail in the television picture as compared to the treatment of the larger areas and coarser detail in the picture. The degree of detail in different areas of the television picture is of course purely relative, and the total frequency band occupied by the television picture signal is not inherently resolvable into any sharply-defined sub-bands representative of different degrees of detail. However, for the purposes of the present invention the picture signal is arbitrarily divided into three bands, A, B and C. Band A contains the unidirectional and relatively low-frequency components of the signal, largely representative of the average background illumination of the image and coarser detail therein. For convenience, these frequencies will hereafter be referred to as the "lows." Band B includes higher frequency video components representative of the medium details of the picture. These frequencies are hereafter designated for convenience as the "highs." Finally, band C includes the frequencies lying above those of band B and extending up to the upper limits of frequencies capable of being transmitted by the system, representative of the fine details of the picture. For convenience, these frequencies will hereafter be referred to as the "super-highs."

As previously indicated, the limits of the above three bands may be rather arbitrarily selected, and they may even overlap to some extent, as will appear later in the detailed descriptions of illustrative embodiments of the invention. Band A may for example be considered as extending from zero frequency (D. C.) up to a relatively low video frequency of the order of from .4 to 1.6 megacycles per second. Band B may for example be considered as extending from these frequencies up to medium video frequencies of the order of from 3.3 to 4.0 mc. p. s. Band C may be considered as extending from the upper limit of band B to the highest frequency capable of being generated and transmitted, for example, a frequency of the order of from 5.3 to 7.0 mc. p. s.

Observations indicate that the eye of the viewer at the receiver is not as susceptible to flicker in small areas of the reproduced picture image as it is to flicker in the large areas. In accordance with my invention large area flicker is prevented by subdividing the television picture signal into these three contiguous bands, as above explained, and transmitting the information in band A during all picture fields, in regular 60-c. p. s. sequence as in present-day monochrome transmission. Band B represents nearly the entire remaining video frequency range which can currently be transmitted and reproduced in accordance with present-day standards, and the information of this band is transmitted during non-consecutive, periodic time intervals, for example during the odd picture fields. The information of band C, which extends well beyond the limit of that now capable of being transmitted and received, is transmitted during the intervening time intervals, for example during the even picture fields. In order to accomplish this, the band C of "super-highs" is first transposed in frequency in order to fit substantially into the same frequency range as band B. In this way, I am able to transmit both the "highs" and the "super-highs" within the same interval of time now required to complete one picture frame, and with a substantial increase in picture detail, as viewed by the eye of the observer. The horizontal line-resolution of the picture image may thereby be increased so as to be equal to, or even better than, the vertical line-resolution. Thus, my improved system may be termed the "alternating highs" system, because both the "highs" and the "super-highs" are alternately transmitted within substantially the same frequency spectrum, and well within the limits of frequency capable of being radiated and received in accordance with present-day television broadcasting standards.

It is accordingly a primary object of my invention to provide improved systems and methods for the transmission and reproduction of facsimile images with a higher degree of picture definition, for a given transmission bandwidth, than has heretofore been possible.

Another object of my invention is to provide improved high definition television systems and methods which are fully compatible with the current standards adopted for television broadcasting.

Yet another object of my invention is to provide an improved television system and method for transmitting and receiving television picture images in natural colors, with a minimum of modification of existing equipment.

More specifically, it is an object of my invention to provide improved systems and methods for transmitting television picture signals, together with accompanying sound signals, within the present-day standard television channel having a 6-megacycle bandwidth, and with substantially higher fidelity than is presently obtainable in broadcasting practice.

For additional objects and advantages, and for a better understanding of my invention, attention is now directed to the following description and accompanying drawings. The features of my invention which are believed to be novel are particularly pointed out in the appended claims.

In the drawings:

Fig. 1 is a one-line block diagram of a television transmitter for radiating high-definition monochrome television picture signals in accordance with my invention;

Fig. 1*a* represents a modification of that portion of the transmitter of Fig. 1 within the dashed rectangle, for the purpose of adapting it to the transmission of color television signals;

Figs. 2*a*–2*d* are a group of electrical wave forms, on a common frequency scale, which illustrate the frequency characteristics of certain filter networks in the transmitter of Fig. 1;

Fig. 3 is a one-line block diagram of a television receiver adapted to receive the picture signal radiated by the transmitter of Fig. 1 and to reproduce the transmitted image;

Fig. 3*a* illustrates a modification of that portion of the receiver of Fig. 3 within the dashed rectangle, for the purpose of adapting it to receive a color television signal from the transmitter when modified as shown in Fig. 1*a*;

Fig. 4 is another circuit diagram of the same television receiver as is shown in Fig. 3, showing in greater detail certain circuit components which are particularly involved in the present invention;

Figs. 5*a*–5*j* are another group of electrical wave forms, on a common frequency scale, which will be referred to in analyzing the operation of the system and method of the invention;

Figure 1:
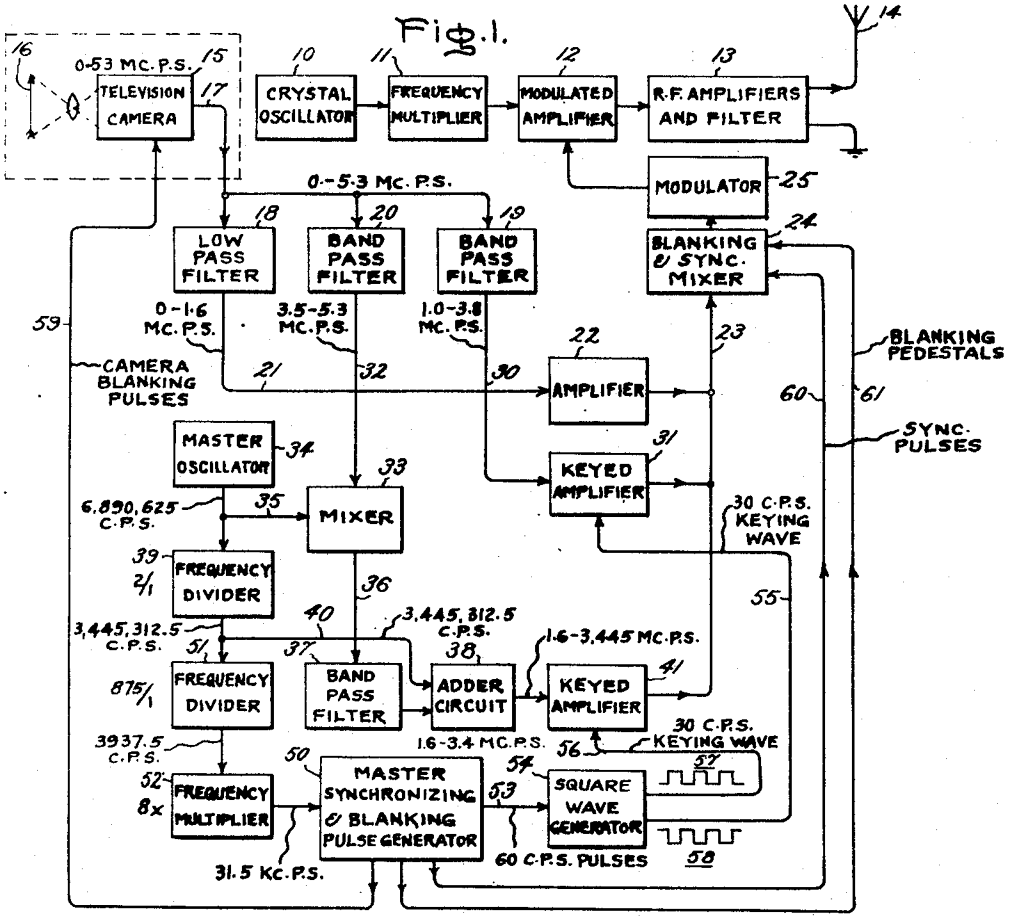

Reference is now made to the television transmitter illustrated schematically in Fig. 1. Since all of the individual circuit components and elements of the transmitter may be conventional and of various forms well-known to those skilled in the art, they have been indicated in block form to simplify the drawing. The main carrier wave is derived in conventional manner from a crystal oscillator 10 and frequency multiplier 11. It is modulated, in a manner shortly to be described in greater detail, by the various components of the composite picture signal, in the modulated amplifier 12. The complete modulated carrier wave is then further conventionally amplified, and also preferably passed through waveshaping filters, as indicated by the block 13, before being impressed upon a suitable signal transmission channel, represented by the antenna 14. The output filter characteristics are preferably such as to provide standard vestigial sideband transmission, as will readily be understood by those skilled in the art without detailed explanation. For those interested in further details, reference may be made, for example, to the article beginning at page 115 of the "Proceedings of the I. R. E.," March 1941, or to the article beginning at page 301 of the "R. C. A. Review," January 1941.

The picture signal is also generated in conventional manner by means of a television camera 15 which may be of any known type adapted to scan an object or scene 16 and to deliver a corresponding video signal to the output conductor 17. In order to realize the full benefits of the present invention, this camera should be selected so as to be capable of generating a high-fidelity picture signal; that is, it should be capable of providing video frequency components extending considerably higher than 4 mc. p. s. For example, in the particular embodiment of Fig. 1 selected for purposes of illustration, it is assumed that camera 15 is capable of generating frequencies in the range of 0–5.3 mc. p. s. There are numerous commercially-available television cameras capable of meeting this requirement, particularly those of the orthicon type.

Figure 2:
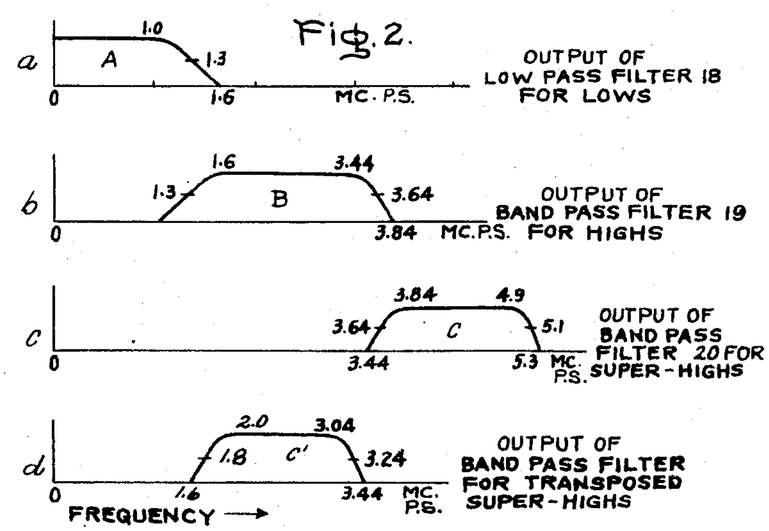

The complete video signal, containing picture signal components from zero to 5.3 mc. p. s. is simultaneously impressed upon three filters: (1) a low pass filter 18 having a cutoff frequency of about 1.6 mc. p s., (2) a band pass filter 19 capable of transmitting frequencies within the range of about 1.0–3.8 mc. p. s., and (3) a band pass filter 20 capable of passing frequencies in the range of about 3.5–5.3 mc. p. s. Thus, these three filters effectively divide the video signal into the three substantially-contiguous bands A, B and C, respectively, which have been previously mentioned. Suitable filter characteristics, which are readily obtainable with known types of filters, are graphically represented in Figs. 2a, 2b and 2c. The filters are preferably designed to have rather gradual cut-off characteristics, as shown, in order to hold "ringing" transients to a minimum. They should be nearly complementary, so that the over-all band pass characteristic of the three filters approximates that of the impressed camera signal.

The output of the low pass filter 18, which comprises the "lows" of band A, is supplied over a conductor 21 and through a suitable video amplifier 22 to a common video output conductor 23 feeding a blanking and synchronizing pulse mixer 24. Here the synchronizing pulses and blanking pedestals are added to the video signal in well-known manner and supplied to a conventional amplitude modulator 25 whose output in turn modulates the carrier wave in the modulated amplifier 12. Except for the restriction in video bandwidth to the "lows" of band A, the system as thus far described operates in the manner of the conventional monochrome television transmitter.

The output of band pass filter 19, which comprises the "highs" of band B, is supplied over conductor 30 to a keyed amplifier 31. The amplifier 31 is rendered alternately conductive and nonconductive, in a manner shortly to be described, so that the "highs" signal is supplied over common conductor 23 so as to modulate the carrier only during alternate picture fields, for example during the odd fields.

The "super-highs" of band C are also supplied to the common conductor 23 so as to modulate the carrier during the intervening picture fields, for example during the even picture fields; but first these must be transposed in frequency. To accomplish this, the output of band pass filter 20 is first supplied over conductor 32 to a conventional heterodyne converter or mixer 33. In the mixer 33 the "super-highs" are heterodyned with a frequency supplied over a conductor 35 from a master oscillator 34, this frequency being suitably selected so that the transposed band lies within the same frequency range as band B. In Fig. 1 the frequency of master oscillator 34 has been indicated as 6,890,625 c. p. s. As is well known, the heterodyning or mixing of the band C with the master oscillator frequency gives rise to upper and lower side bands having the same bandwidths. These are supplied over conductor 36 to a band pass filter 37 which selects the lower, difference-frequency side bands. This is the band C′, as indicated by the filter characteristics of Fig. 2d. For convenience of reference, the frequencies within the band C′ will hereafter be designated as the "transposed super-highs." In this particular embodiment of the invention, it will be observed that the components of band C have not only been shifted in frequency but inverted as well. The lowest frequency in band C′, namely 1.6 mc. p. s., is the difference between the master oscillator frequency of about 6.9 mc. p. s. and the highest frequency in band C, namely 5.3 mc. p. s. Similarly, the highest frequency of the "transposed super-highs," which is about 3.4 megacycle, corresponds to the lowest frequency of the "super-highs," which is about 3.5 mc. p. s.

In order to effect re-transposition of band C′ in the receiver, as will shortly be described, a sub-carrier frequency equal to one-half that of master oscillator 34 is also combined with the output of filter 37 in an adder circuit 38. This may conveniently be provided by supplying the output of master oscillator 34 through a 2/1 frequency divider 39 whose output is supplied over conductor 40 to the adder circuit 38. In the adder circuit 38 the sub-carrier frequency of 3,445,312.5 c. p. s. is added to (not mixed with) the output of band pass filter 37. There are various known circuits suitable for this purpose, one of the simplest ones being a pair of amplifiers having their anodes tied to a common output load impedance and their grids separately supplied with the two signals to be added together.

The output of adder circuit 38, which includes band C' and the closely-adjacent sub-carrier frequency, is supplied through a keyed amplifier 41, which may be substantially identical to amplifier 31 and whose output is supplied to the same common conductor 23.

The usual pulse signals required for blanking and synchronizing the camera sweep circuits, and for supplying the synchronizing pulses and blanking pedestals to the mixer 24, may be generated in a conventional master synchronizing and blanking pulse generator 50. This generator is synchronized from the master oscillator 34 through a suitable frequency divider and multiplier chain. Assuming that the transmitter of Fig. 1 is to operate with standard 525-line, 30-frame, double-interlaced transmission, the required synchronizing frequency input to pulse generator 50 is twice the line scanning frequency, or 31.5 kc. p. s., as is well known to the art. This is readily provided in the transmitter of Fig. 1 by supplying the output of frequency divider 39 through a further frequency divider 51 having a division ratio of 875/1, giving a resultant frequency of 3937.5 c. p. s. This is exactly ¼ the line scanning frequency and is readily converted to the required synchronizing frequency by supplying it to a multiplier 52 in which it is multiplied by a factor of 8.

The master pulse generator 50 supplies 60-cycle pulses over a conductor 53 to synchronize the operation of a square wave generator 54. The generator 54 in turn supplies two trains of synchronized keying pulses, over conductors 55 and 56, in order to key the respective amplifiers 31 and 41. The two keying waves have the same 30 c. p. s. repetition rate and are each of 50% pulse width but of opposite polarity, as indicated graphically by the wave forms 57 and 58. In this way, the keyed amplifiers 31 and 41 are rendered alternately conductive in order to pass video signals to their outputs. The timing of the keying waves is adjusted with reference to the timing of the camera sweep circuits, which are also represented conventionally as being controlled by signals supplied from master pulse generator 50 over conductor 59, so that the amplifiers 31 and 41 are operative during alternate picture fields. The transition in keying should be adjusted to take place during the normal vertical blanking period, so that the transition from one signal to the other is made while the picture tube of a receiver tuned to the transmitter is cut off, or black. In this way, no transition keying streaks will be seen by an observer at the receiver.

While the square wave generator 54 which controls the frequency of alternation between the highs and the super-highs is shown in Fig. 1 to operate at a frequency of 30 c. p. s., other alternating frequencies may of course be employed. In order to avoid a phenomenon known to the art as "crawl," or a tendency for the eye to catch a scanning line and follow it up or down the scanning field, it is preferred that the alternating frequency be made an odd submultiple of the line scanning frequency. The 30 c. p. s. chosen in Fig. 1 meets this requirement since it is the 525th submultiple of 15,750 c. p. s., where 15,750 c. p. s. is the line scanning frequency. Other frequencies which might have been chosen are: 5250 c. p. s., where 15,750 c. p. s. is the line scanning frequency. Other frequencies which might have been chosen are: 5250 c. p. s., the 3rd submultiple of 15,750 c. p. s.; 3150 c. p. s., the 5th submultiple of 15,750 c. p. s.; etc. When a frequency such as 5250 c. p. s. is chosen, it is necessary to divide the time unevenly between the highs and the super-highs if switching is to be confined to the horizontal or line-scanning blanking intervals. Thus two full lines may be employed for highs, followed by one full line for super-highs. This cycle is repeated continuously. When 3150 c. p. s. is employed, any of the following time divisions are feasible:

| Highs | Super-Highs |
|---|---|
| one-fifth | four-fifths |
| two-fifths | three-fifths |
| three-fifths | two-fifths |
| four-fifths | one-fifth |

Since it is desirable to split the time division in such a manner so as to afford approximately equal times for highs and super-highs, the preferred division in the above listing would be three-fifths for highs and two-fifths for super-highs. Thus three full lines would be employed for highs, followed by two full lines for super-highs. This cycle is repeated continuously.

There is some advantage in increasing the switching frequency to these higher frequencies instead of employing 30 c. p. s. in that it breaks up the picture vertically into relatively small groups, i. e. groups containing but a few lines each. This will decrease the tendency for flicker to be observed since it carries one step further the subdivision of the picture into smaller areas. Any one group will still have a repetition rate of 30 c. p. s., but the groups immediately adjacent will be interlaced in time so that the eye receives 60 impressions per second when it includes in its field of vision as many as two or more groups at once.

The details of circuit design of square wave generator 54 form no part of my present invention, but it is noted for reference that a suitable circuit for this purpose is disclosed in Patent 2,410,703, which was issued November 5, 1946, to Seymour Berkoff and Robert B. Dome, and which is assigned to the same assignee as the present invention.

The synchronizing pulses and blanking pedestals for the composite picture signal are conventionally represented as being furnished from master pulse generator 50 to the blanking and synchronizing mixer 24 over conductors 60 and 61 respectively. These circuit details may again be entirely conventional and will readily be understood by those skilled in the art of television transmitter design without detailed explanation. It will also be apparent that the synchronizing and blanking pulses may optionally be added to the camera signal preceding its separation into the sub-bands A, B and C. In this case the mixer 24 would of course be inserted between the television camera 15 and the filters 18, 19, 20.

Figure 3:
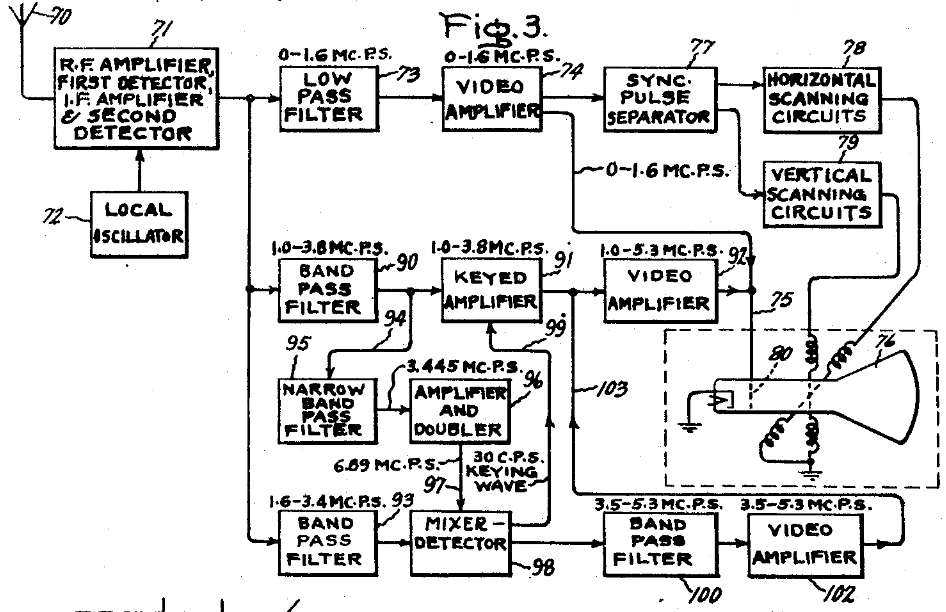

Fig. 3 is a simplified one-line block diagram of a television receiver adapted to receive signals radiated from the transmitter of Fig. 1. The front end of this receiver may be that of a conventional superheterodyne television receiver in which signals received on antenna 70 are amplified, converted to a lower intermediate frequency by mixing them with a local oscillator frequency, further amplified, and finally detected to reproduce the composite television picture signal. To simplify the drawing, all these functions are indicated schematically by the blocks 71 and 72.

The demodulated picture signal is impressed on three separate filters in parallel. The first of these is a low pass filter 73 designed to pass the "lows" of band A, which are transmitted during both odd and even picture fields. The output of filter 73 is amplified by a conventional video amplifier 74 and supplied over conductor 75 to the intensity control grid 80 of a conventional cathode ray picture tube 76. The output of video amplifier 74 also contains sufficient components of the synchronizing pulses for the operation of a conventional synchronizing pulse separator 77 whose output is utilized to control the horizontal and vertical scanning circuits 78 and 79 for the picture tube 76 in well-known manner.

The band pass filter 90 is also supplied with the demodulated picture signal, this filter being designed to have the pass characteristic such that it will pass the "highs" of band B. The output of filter 90 is supplied to a keyed amplifier 91 which is controlled, in a manner to be shortly described, so as to pass video signals to its output only during those fields in which the "highs" are received. The resultant signals are again further amplified in a conventional video amplifier 92 and impressed on the control grid 80 of picture tube 76 over the common conductor 75.

A third filter 93, supplied with the demodulated picture signal, is designed to have a band pass characteristic sufficient to pass the "transposed super-highs" of the band C'. However, these frequencies must be retransposed before they are supplied to the control grid 80 of the picture tube 76. It will be recalled from the preceding description of Fig. 1 that a special sub-carrier of about 3.445 mc. p. s. is radiated by the transmitter. This frequency is recovered by supplying a portion of the output of band pass filter 90 over conductor 94 to a narrow band pass filter 95. The output of filter 95 is supplied to an amplifier and frequency doubler 96 which generates a 6.89 mc. p. s. wave of the same frequency as that used in effecting the original transposition. This wave is in turn mixed or heterodyned with the video signal from band pass filter 93 in a mixer-detector 98. The output of detector 98 contains a difference frequency sideband of 3.5–5.3 mc. p. s. corresponding exactly to the original "super-highs" of band C. These are selected in a band pass filter 100, further amplified in a high-frequency video amplifier 102 and then supplied over a conductor 103 to video amplifier 92.

It will also be recalled from the preceding description of Fig. 1 that the retransposition carrier frequency of 3.445 mc. p. s. is only transmitted through the keyed amplifier 41 during those alternate picture fields in which the "transposed super-highs" are transmitted. Therefore, it is possible to utilize the D. C. component in the output of mixer-detector 98 in Fig. 3 to recreate a 30-c. p. s. keying wave suitable for controlling the keyed amplifier 91. The circuit is so arranged that whenever the 3.445 mc. p. s. wave is present in the received signal, the amplifier 91 is keyed off.

Figure 4:
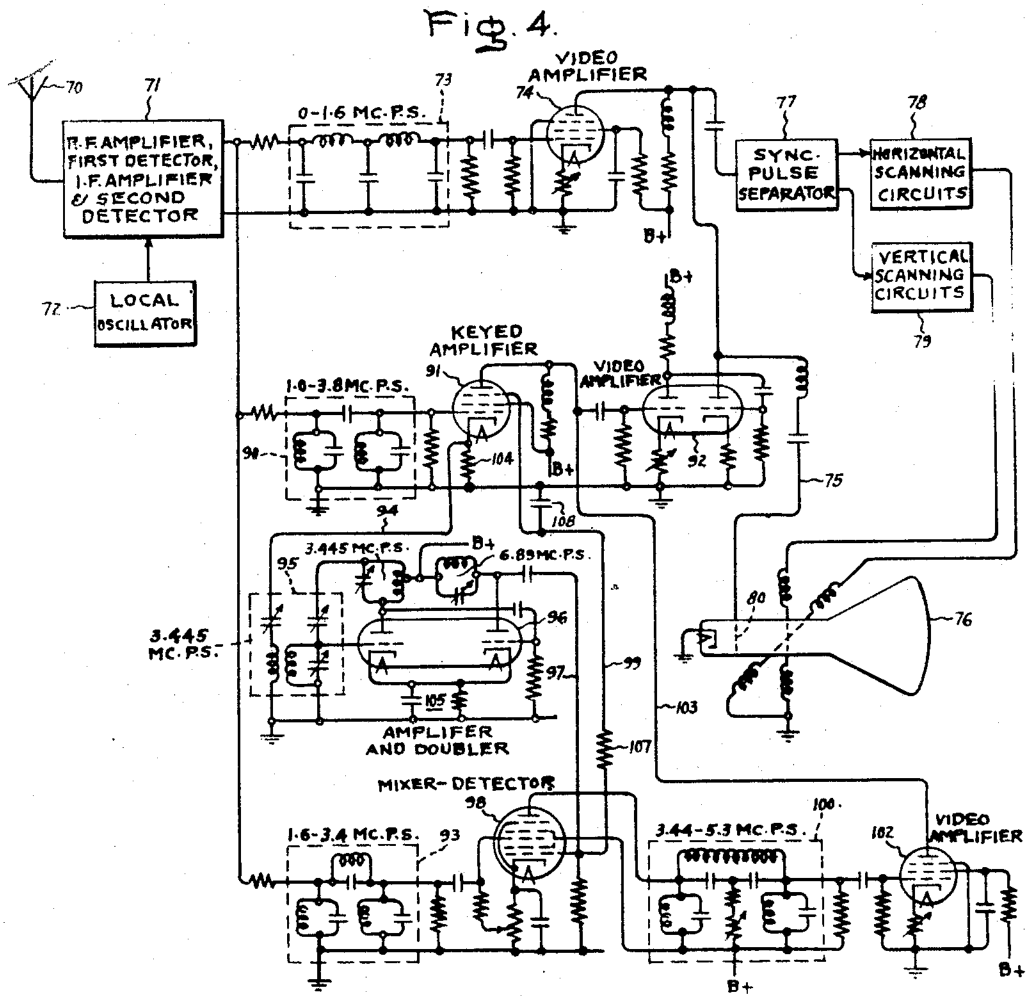

For completeness of illustration, certain circuit elements of the receiver of Fig. 3 are shown in more detailed form in Fig. 4. To facilitate comparison, corresponding elements have been designated by the same reference numerals as in Fig. 3. It will of course be understood that these circuits are only illustrative of various circuits which might be selected for the purpose. In one particular receiver the following tube types were used in the circuits shown in detail in Fig. 4.

| Circuit Component | Tube Type |
|---|---|
| Video amplifier 74 | 6AU6 |
| Keyed amplifier 91 | 6AS6 |
| Video amplifier 92 | 12AU7 |
| Amplifier-Doubler 96 | 12AX7 |
| Mixer-Detector 98 | 6BE6 |
| Video Amplifier 102 | 6AU6 |

In the particular circuits of Fig. 4, the voltage for the 3.445 mc. p. s. narrow-band-pass filter 95 is taken from a cathode load resistor 104 of keyed amplifier 91, which is a pentode. The amplifier and doubler 96 consists of a pair of triodes in a common envelope, having a common cathode bias impedance network 105. The left-hand section comprises a neutralized amplifier having both its input and output circuits tuned to 3.445 mc. p. s., neutralization being furnished through the variable capacitor 106. The right-hand section of the doubler has its output tank circuit tuned to 6.89 mc. p. s.

It will be noted that the mixer-detector 98 comprises a pentagrid amplifier tube having the input voltages from band pass filter 93 impressed upon its #3 grid and the 6.89-mc. p. s. sub-carrier wave impressed upon its #1 grid. The input for band pass filter 100 is taken from the anode of mixer-detector 98, while the 30-c. p. s. keying wave for amplifier 91 is supplied by the D. C. component of current developed at its #1 grid. In the particular receiver of Fig. 4, this keying voltage is impressed upon the suppressor grid of amplifier 91 through a low-pass filter network comprising a series resistor 107 and a shunt bypass capacitor 108. In all other respects, the circuit connections of Fig. 4 are entirely conventional and will readily be understood by those skilled in the art upon inspection.

Figure 5:
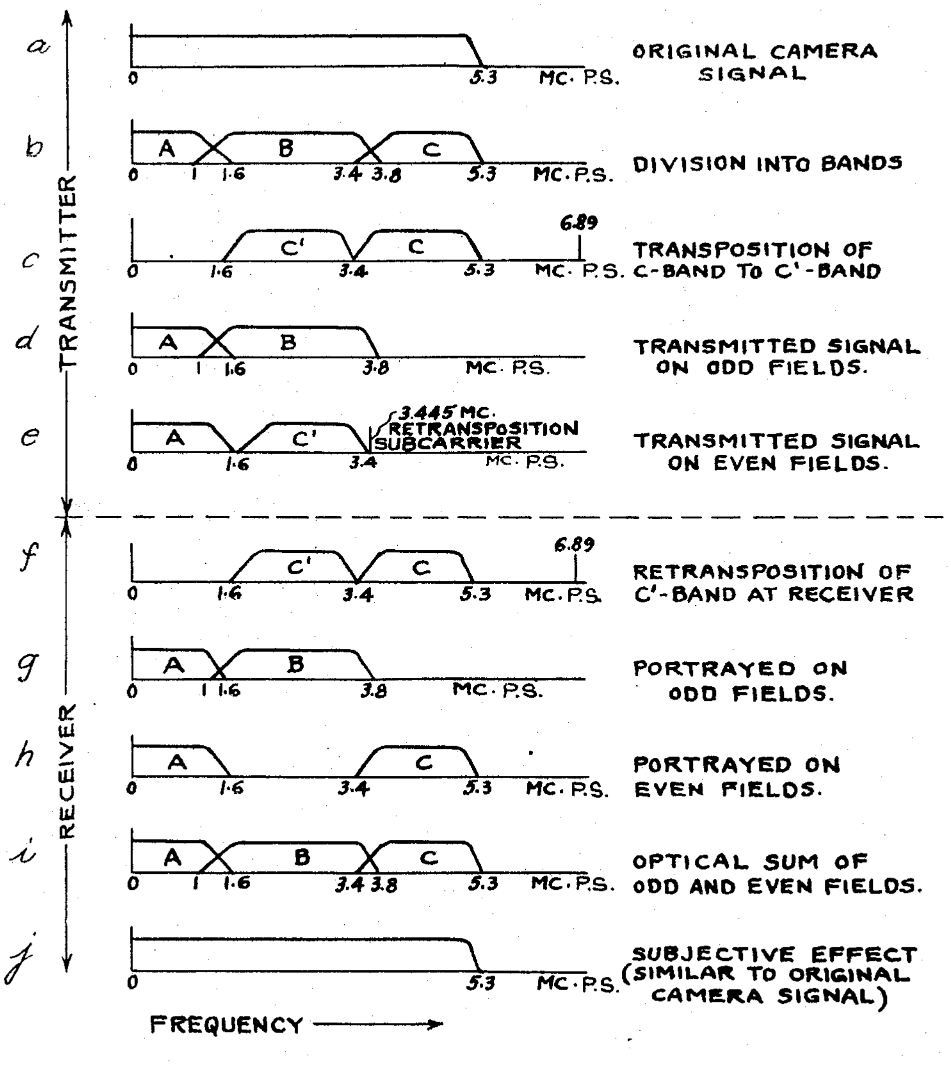

The fundamental steps in the sequence of operation of the transmitting and receiving system thus far described are indicated graphically by the characteristic curves of Fig. 5. These may be briefly recapitulated as follows:

(1) The original camera signal of Fig. 5*a* is first divided into the three complementary frequency bands A, B and C, comprising the "lows," the "highs" and the "super-highs";

(2) As shown in Fig. 5*c*, the C-band is transposed into the C'-band, which lies within substantially the same spectrum as the B-band;

(3) Bands A and B are transmitted during odd picture fields, as shown in Fig. 5*d*;

(4) Bands A and C', together with the retransposition sub-carrier, are transmitted on even picture fields, as shown in Fig. 5*e*;

(5) At the receiver, the C'-band is retransposed into the C-band in response to receipt of the retransposition sub-carrier, as shown in Fig. 5*f*;

(6) As indicated in Fig. 5*g*, the picture image portrayed during odd picture fields contains the background and coarse detail of band A and the medium detail of band B;

(7) As indicated in Fig. 5*h*, the picture image portrayed during even picture fields contains the background and coarse detail of band A and the fine detail of band C;

(8) Due to persistence of vision, the eye of the observer receives a subjective effect which is the optical sum of the picture components received during odd and even fields, corresponding closely to the original camera signal, as indicated by Figs. 5*i* and 5*j*.

It has previously been indicated that this system is compatible with present-day equipment for monochrome television broadcasting, in that a conventional monochrome receiver can receive this type of signal and produce a satisfactory picture image (although, of course, without the increased picture definition obtainable with the specially-designed receiver of Figs. 3 and 4). From Fig. 5*d* it will be observed that the picture signal received during odd fields is essentially no different from that provided by conventional monochrome transmitters, and that it contains frequency components of sufficiently high frequencies to provide a picture definition comparable to that now produced by conventional receivers. However, during the transmission of the signal shown in Fig. 5*e*, during even fields, only the "lows" of band A are useable in a conventional receiver. It might be assumed that the transposed signals of band C' and the sub-carrier wave would cause interference and distortion of the picture image. However, the effect of these frequencies can be substantially cancelled out, so far as the eye of the observer is concerned, by utilizing the principles of frequency-interlace which are particularly described and claimed in my copending application Serial No. 176,405, filed July 28, 1950, and assigned to the same assignee as the present invention.

Briefly, in effecting this cancellation of undesired frequency components from the observed picture image, I make use of the known fact that the frequency spectrum of a television picture signal is not continuous but instead consists of discrete bands of video frequencies concentrated at or near harmonics of the scanning frequencies. Therefore, if the frequencies of an unwanted signal are displaced from those frequencies of a wanted signal, lying within the same frequency spectrum, by an odd multiple of one-half the line scanning frequency, the components of the two signals will be interlaced in frequency. Furthermore, as is particularly explained in detail in my aforesaid copending application, the unwanted frequency components will produce equal and opposite variations in picture brightness on alternate picture fields and will be substantially integrated out by the physiological phenomenon of persistence of vision in the eye of the observer.

In the illustrative transmitting system of Fig. 1, the frequency of master oscillator 34 has been chosen so as to provide the desired frequency-interlace of the "highs" and of the "transposed super-highs." According to present broadcasting standards, one-half the line scanning frequency is 7875 c. p. s. The illustrative master oscillator frequency of 6,890,625 c. p. s. is 875 times 7875 c. p. s., thereby fulfilling the required conditions. Thus, the frequency components of band C', although present in the image produced during even fields in a conventional receiver, are self-cancelling insofar as their presence in the picture image is observable to the eye.

Figure 6:
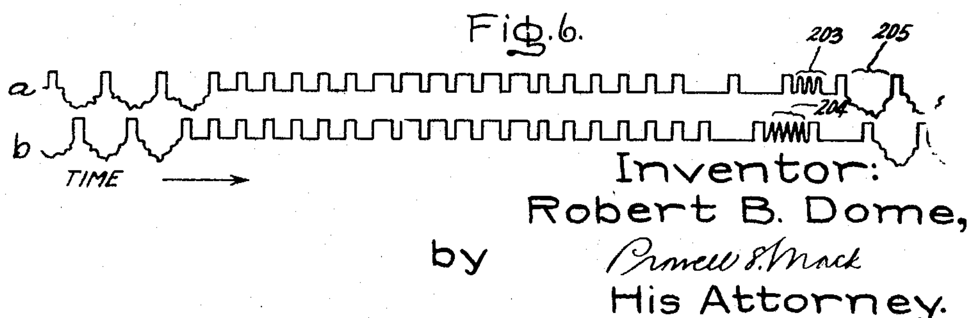
Figs. 6a–6b are a pair of synchronizing signal waveforms, on a common time scale, which will be referred to in connection with still another modification of my invention.
Figure 7:
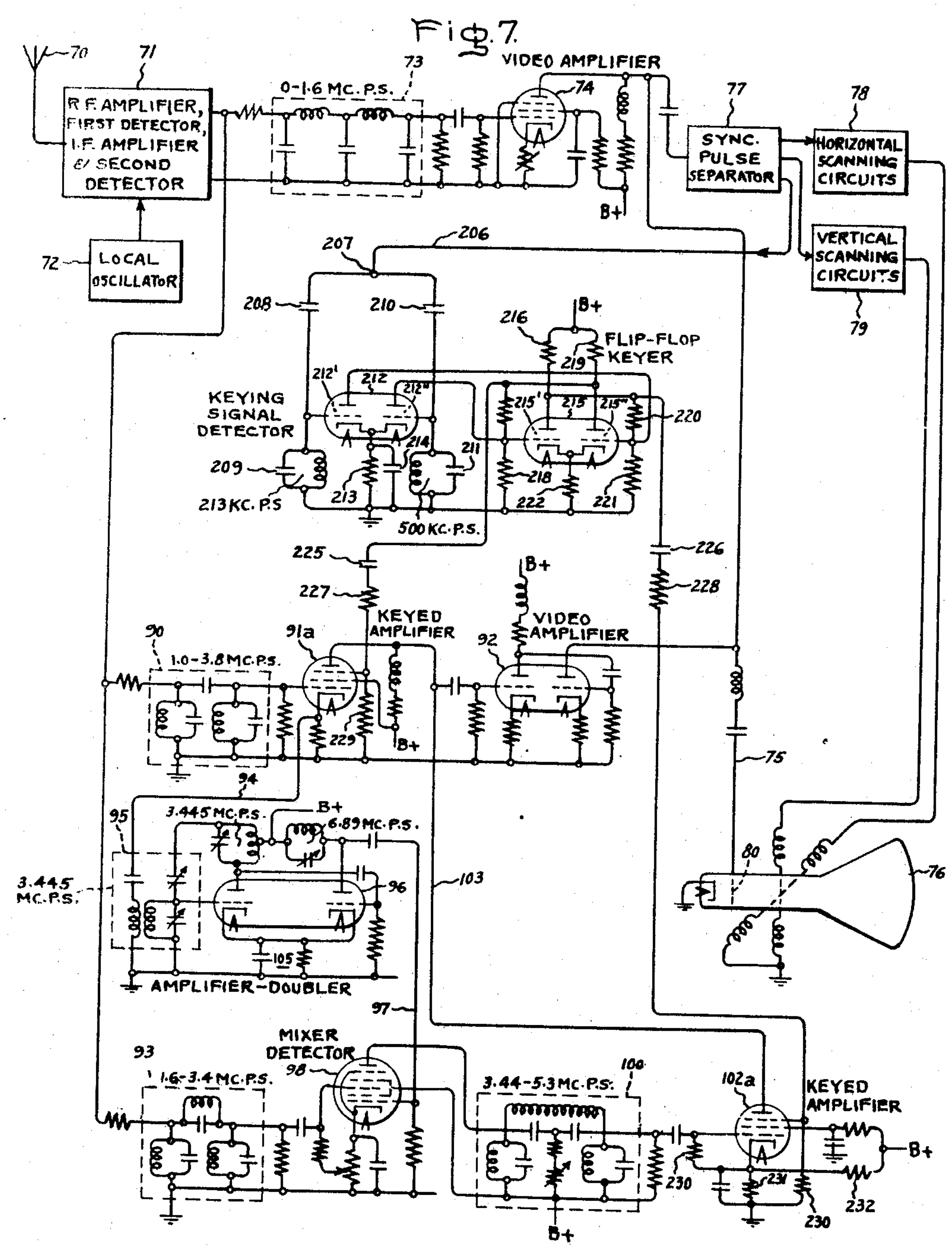
Fig. 7 is another circuit diagram, partly in simplified block form, of a modified form of receiver adapted to use the synchronizing signals of Figs. 6a–6b.

An alternative method for accomplishing the switching of the high frequency detail and the super-high-frequency detail is illustrated in Figs. 6 and 7. The two waveforms of Figs. 6*a* and 6*b* represents the synchronizing information transmitted during the vertical blanking periods for odd and even fields, respectively. These waveforms are exactly the same as those currently employed in black-and-white television transmission with the exception of short bursts of high frequency sine-wave components 203 and 204 which are injected near the ends of the vertical blanking periods. On odd fields for example, the high frequency wave 203 may have a frequency of 213 kc. p. s., while on even fields the injected sine-wave 204 may have a higher frequency, such as 500 kc. p. s. The two frequencies are preferably non-harmonically related, so that harmonics of the lower frequency will not lie close to the higher frequency.

Suitable circuits for generating and inserting the sine-wave signals 203 and 204 into the composite television signal at the transmitter will readily be apparent to those skilled in the art without detailed illustration, since the principles are well known and the details of such circuits form no part of the present invention.

A modified form of receiver for using the special keying signal of Fig. 6 is illustrated in Fig. 7. Many of the elements of this receiver may be identical to those of Fig. 4. Such elements are, therefore, identified by the same reference numerals and need not be described further. Other elements which are not identical to those of Fig. 5 but which perform corresponding functions are identified by corresponding reference numerals with the suffix letter "*a*" added to facilitate comparison.

In the receiver of Fig. 7, a portion of the output of synchronizing pulse separator 77, which in this case comprises the waves of Figs. 6*a* and 6*b*, is impressed upon a special keying signal detector, through a conductor 206. Conductor 206 connects to two parallel branch circuits at point 207. The left-hand branch includes a coupling capacitor 208 and a shunt-tuned circuit 209. The right-hand branch includes a coupling capacitor 210 and a shunt-tuned circuit 211. The tuning of circuit 209 is adjusted so that maximum response is obtained at the frequency represented by the sine-wave 203 of Fig. 6, while the tuning of circuit 211 is adjusted so that maximum response is obtained at the frequency represented by wave 204 of Fig. 6. As a result of these adjustments, it will be found that in operation, a burst of voltage in the form of a narrow positive pulse will occur alternately across the tuned circuits 209 and 211 in synchronism with the appearance of the sine-wave bursts in the transmitted synchronizing signal.

A pair of triode amplifiers 212' and 212'', shown within a single envelope 212, is employed as detectors for the two waves. Plate detection is obtained in these triodes by applying sufficient negative bias voltage to their grids. This may be conveniently obtained by the use of a cathode bias resistor 213, which is by-passed by a capacitor 214 to avoid the effects of degeneration. Negative-going pulses will consequently appear at the anodes of the triodes in synchronism with the original sine-waves 203 and 204.

A second pair of triode amplifiers 215′ and 215″, shown within a single envelope 215, is connected in a well-known form of flip flop circuit comprising resistors 216, 217, 218, 219, 220, 221, and 222. As will readily be understood by those familiar with such circuits, the flip-flop circuit has two stable modes and can be triggered between these modes by suitable pulses applied to the respective grids of the triodes 215′ and 215″. The pulses present at the anodes of triodes 212′ and 212″ in fact accomplish the triggering, so that the potentials of the anodes of devices 215′ and 215″ alternate between two levels in synchronism with the original sine-wave bursts 203 and 204. Thus, when a negative pulse at the anode of triode 212′, developed in response to a sine-wave burst 203, is applied to the control grid of triode 215″, this pulse shuts off the plate current in the triode 215″, thereby raising the anode potential of the triode 215″, and by virtue of the cross-connection through resistor 217, depressing the anode potential of the triode 215′. This state will be maintained until a sine-wave burst 204 appears, causing a negative pulse to be applied to the grid of triode 215′ and reversing these conditions.

The square waves thereby produced at the anodes of triodes 215′ and 215″ are employed to key respective amplifiers 102*a* and 91*a*. This is accomplished by feeding the square waves through coupling capacitors 225 and 226 to keying electrodes (in this case shown as suppressor grids) within amplifiers 91*a* and 102*a* respectively. Series resistors 227 and 228 may also be employed, if desired, to remove any small irregularities in the keying waves. Coupling resistors 229 and 230 are employed to carry the direct current drawn by the keying electrodes, and are selected to have appropriate time constants (in conjunction with condensers 225 and 226) so that the keyed amplifiers 91*a* and 102*a* are maintained cut off during the negative-going portions of the square waves supplied from triodes 215″ and 215′.

With the circuit connections of Fig. 7, a sine-wave burst 203 will cause keyed amplifier 91*a* to be made conductive and keyed amplifier 102*a* to be made non-conductive, while a burst 204 will cause keyed amplifier 102*a* to be made conductive and keyed amplifier 91*a* to be made non-conductive.

Now if odd fields (the fields following the pulses 203) carry the "highs," keyed amplifier 91*a* will transmit this information to the cathode ray picture tube. Similarly, amplifier 102*a* will be keyed to transmit the "super-highs" information to the picture tube during even fields.

When standard monochrome signals are being received (i. e., when the high definition system is not employed), synchronizing pulses 203 and 204 will not be radiated so that device 215 will be quiescent at one of its two states. The suppressor grid of amplifier 91*a* will come to rest at ground potential, because it is A. C.-coupled to the anode of triode 215″, so amplifier 91*a* will pass the information of both odd and even fields. On the other hand, device 102*a* will be biased beyond cut-off as a result of a fixed bias established across a cathode resistor 231 by current flow through a bleeder resistor 232 connected to B+.

Figure 8:
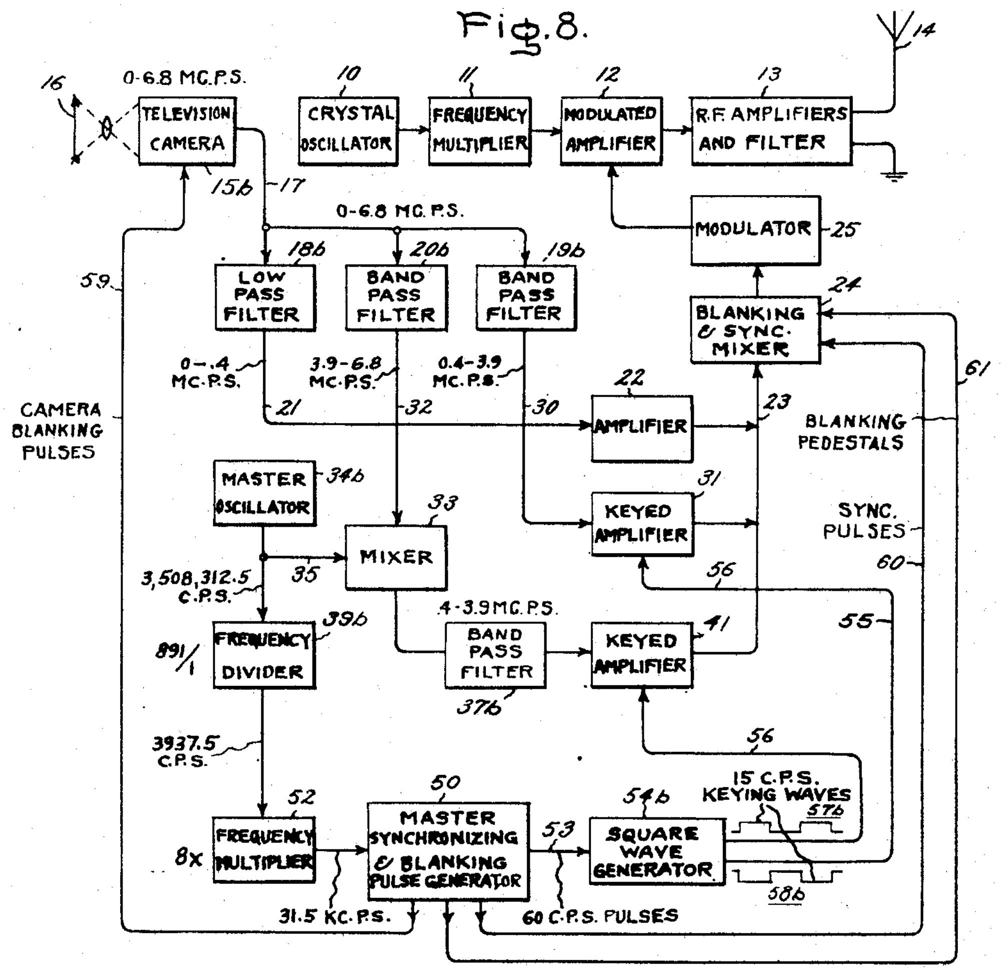
Fig. 8 is a one-line block diagram of a simplified form of monochrome television transmitter embodying the invention.
Figure 9:
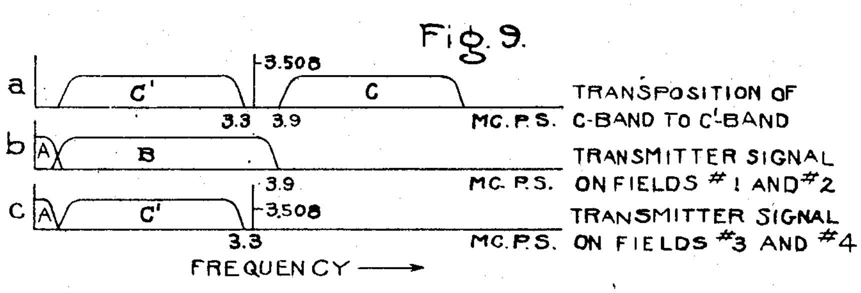
Figs. 9a–9c are another group of electrical wave forms, on a common frequency scale, illustrating certain characteristics of the transmitter of Fig. 8.
Figure 10:
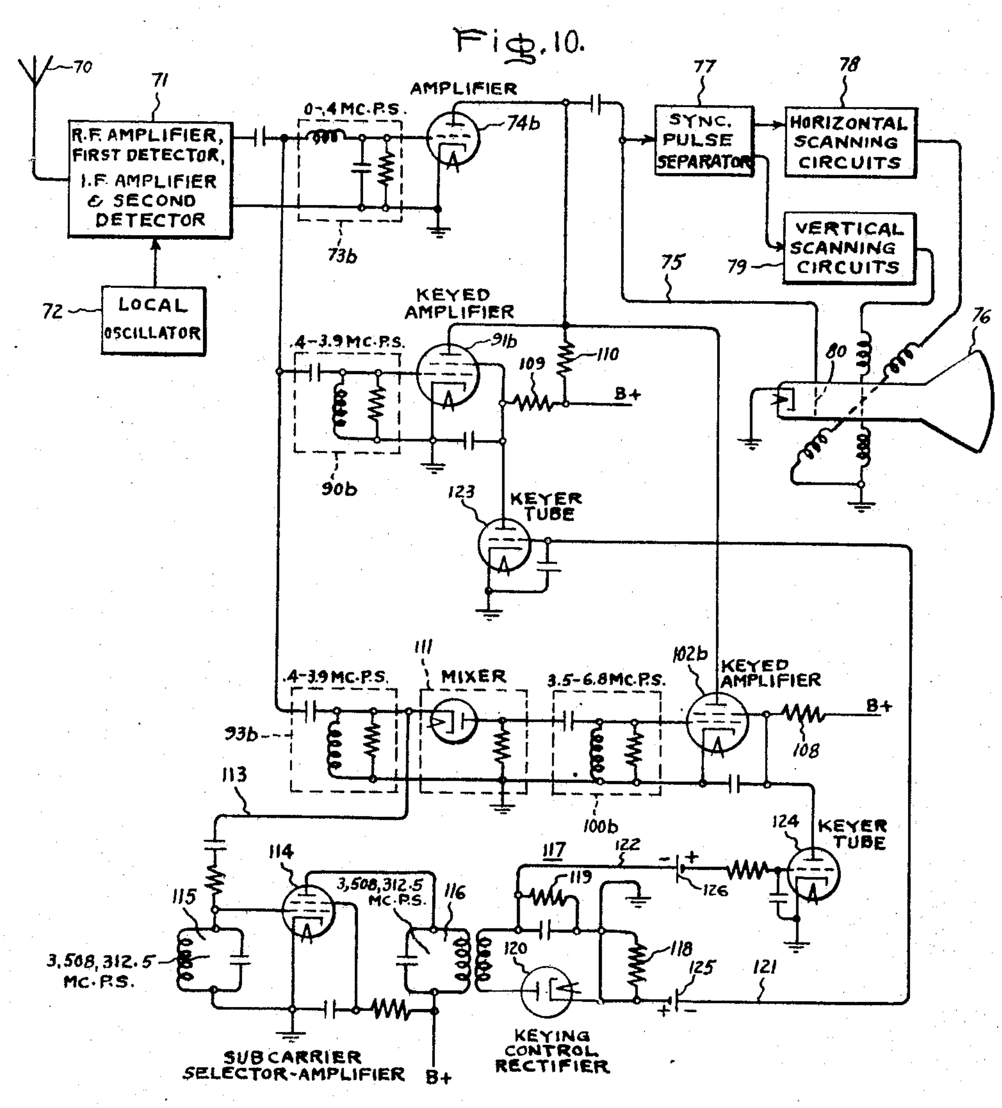
Fig. 10 is a circuit diagram, partly in simplified one-line block form, of a television receiver suitable for receiving the picture signals from the particular transmitter shown in Fig. 8.

Figs. 8, 9, and 10 illustrate still another television transmitting and receiving system and method which employ the same fundamental principle of "alternating highs" but which involve certain simplifications over the system and method of Figs. 1–5. The principal differences are: (1) the same sub-carrier frequency employed in the transposition of the "super-highs" is also used for retransposition in the receiver and (2) four complete picture fields are required to complete the cycle of operations. In this simplified system, many of the circuit components thereof may be identical to those previously described in detail with respect to Figs. 1–5. They are, therefore, indicated by the same reference numerals and need not be further described. Many other components, while not identical, have corresponding functions, so these components are indicated by corresponding reference numerals with the suffix letter "*b*" added to facilitate comparison.

In the transmitter of Fig. 8, the television camera 15*a* is represented as being capable of supplying a very high fidelity video signal, for example one having components extending up to 6.8 mc. p. s. For the purposes of illustration, the camera output is represented as being subdivided into the three bands as follows:

| | Mc. p. s. |
|---|---|
| Band A (filter **18***b*) | 0–.4 |
| Band B (filter **19***b*) | 0.4–3.9 |
| Band C (filter **20***b*) | 3.9–6.8 |

It might be well to point out here that a practical choice of the upper frequency limit of band A involves a compromise in any case between the transmission of maximum picture detail on the one hand, and minimum flicker and maximum compatibility with existing receivers on the other hand. That is, the lower this frequency, the greater is the amount of detail which can be transmitted by the "super-highs" lying above the frequency limits of transmission. However, the lower this frequency limit, the less is the information which is transmitted continuously to conventional monochrome receivers and the greater is the flicker effect due to the alternate transmission of "highs" and "super-highs."

In the transmitter of Fig. 8, the output of low pass filter 18*b* is continuously supplied to modulator 25 in the same manner as in the transmitter of Fig. 1. Similarly, the output of band pass filter 20*b* is supplied to a mixer 33. However, in this embodiment, the master oscillator 34*b* is illustrated as operating at a frequency of 3,508,312.5 c. p. s. This frequency is again selected in the interest of the greatest compatibility with existing monochrome receivers, and again differs from an integral multiple of the line scanning frequency. However, in this case it is selected to be an odd integral multiple of one-fourth the line scanning frequency (specifically, the 891st multiple of 3937.5 c. p. s.).

The output of band pass filter 20*b* is combined with the output of master oscillator 34*b* in the mixer 33, and their difference frequency is selected by band pass filter 37*b*, in the same manner as in the transmitter of Fig. 1. However, as shown in Fig. 9*a*, the "transposed super-high" of band C are in this case merely shifted in frequency, and not inverted in frequency, because the 3.5 mc. p. s. sub-carrier in this case lies below band C. The filter 37*b* is designed not only to pass the band C′, which extends approximately from 0.4 to 3.3 mc. p. s., but also the 3.508 mc. p. s. sub-carrier. The adder circuit 38 of Fig. 1 is therefore unnecessary, the output of band pass filter 37*b* being supplied directly to the keyed amplifier 41.

The square wave keying generator 54*b* of Fig. 8 may also be of generally the same form as that described in connection with Fig. 1, but in this case the square wave keying frequency is equal to one-half the frame repetition rate of 30 c. p. s. Therefore, the amplifiers 31 and 41 are alternately keyed on during consecutive picture frames. The transmitted signal on picture fields #1 and #2 is as indicated in Fig. 9b, comprising band A and band B. On fields #3 and #4, the transmitted signal is as represented in Fig. 9c, comprising band A, band C′, and the 3.508 mc. p. s. sub-carrier.

Referring now to the simplified receiver of Fig. 10, the "lows" of band A are selected by a suitable low pass filter 73b, amplified in viedo amplifier 74b and supplied over conductor 75 to the control grid 80 of the picture tube 76 in the same manner as previously described in connection with the receiver of Figs. 3 and 4. The "highs" of band B are similarly selected by a simple band pass filter 90b and supplied to the input of a keyed amplifier 91b, comprising a tetrode. When amplifier 91b is conductive, its output is added to the output from amplifier 74b by virtue of the fact that the anodes of the two amplifiers are connected to a common anode load resistor 110.

The "transposed super-highs" of band C′, are similarly selected by a simple band pass filter 93b and impressed upon a transposition mixer 111, which in this case is represented as comprising a diode detector. Heterodyne conversion takes place by virtue of the fact that the 3.508-mc. p. s. sub-carrier wave is also supplied to the diode mixer 111 through the filter 93b. In this case, it is necessary to select the sum-frequency band, or upper side band, in the band pass filter 100b. The output of filter 100b is supplied to another keyed amplifier 102b comprising a tetrode whose anode is also connected to the common output load resistor 110.

The presence or absence of the 3.508-mc. p. s. sub-carrier is also utilized in the receiver of Fig. 10 to key the amplifiers 91b and 102b on and off in alternate succession. For this purpose, a portion of the output of filter 93b is supplied over conductor 113 to a sub-carrier selector-amplifier 114 having both its input tank circuit 115 and its output tank circuit 116 sharply tuned to the sub-carrier frequency. The output of amplifier 114 is then impressed upon a diode rectifier circuit 117 which functions as the keying control rectifier. This rectifier circuit has two load resistors 118 and 119 in series, with a common ground connection between them. The diode 120 is so connected that a positive potential with respect to ground appears across resistor 118 whenever the sub-carrier is present, and at the same time a negative potential with respect to ground appears across resistor 119. These potentials are respectively impressed through conductors 121 and 122 upon the control grids of triode keyer tubes 123 and 124. The anodes of these keyer tubes are in turn respectively connected to the screen grids of tetrode amplifiers 91b and 102b. When no sub-carrier is present, suitable fixed biasing means, represented by the bias batteries 125 and 126, maintain keying tube 123 normally non-conductive and keying tube 124 normally conductive. Keying tube 124 therefore normally draws anode current through the screen resistor 108 for amplifier 102b. This current is adjusted so that the screen grid potential of amplifier 102b is below cut-off. At the same time, amplifier 91b is adjusted to operate normally.

Whenever the 3.508 mc. p. s. sub-carrier is received (and it will be recalled from Fig. 9 that this occurs during fields #3 and #4), the positive keying voltage impressed on keyer tube 123 renders it conductive. It now draws sufficient current through the screen resistor 109 to bias amplifier 91b beyond cut-off. At the same time, the negative keying voltage impressed on keyer tube 124 renders it non-conductive, permitting the keyed amplifier 102b to operate with normal screen potential and to pass the "super-highs" to the video output conductor 75. Thus, amplifier 91b supplies signals to picture tube 76 only when the "highs" are received and amplifier 102b supplies output signals only when the "transposed super-highs" are received. It will therefore be apparent that the receiver of Fig. 10 is properly gated by the received signals so as to reproduce the "high" and "super-high" components of the picture image in the same sequence that they are radiated from the transmitter of Fig. 8.

Figure 1A:
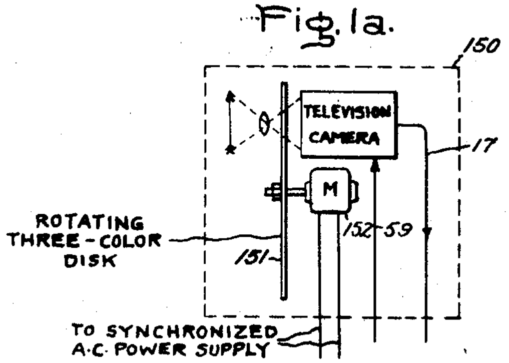
Figure 3A:
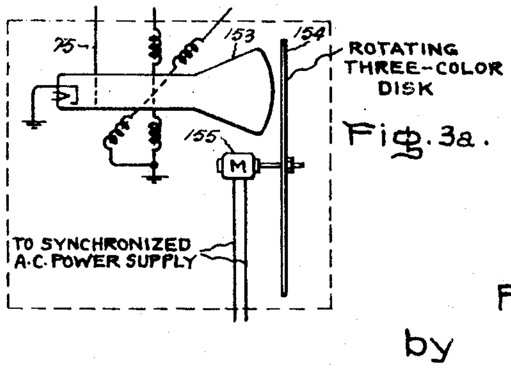

As shown in Fig. 1a, the transmitter of Fig. 1 may very simply be converted to a color television transmitter of the field sequential type by substituting, for the camera 15, a television camera 150 provided with a rotating three-color disc 151 driven by a synchronous motor 152. As shown in Fig. 3a, the receiver of Fig. 3 may similarly be very simply adapted to receive the color picture signals by substituting, for the picture tube 76, a picture signal tube 153 provided with a corresponding rotating three-color disk 154, driven by a synchronous motor 155 in synchronism with motor 152.

The principles involved in the field sequential type of color transmission, in which the two color disks at transmitter and receiver are synchronized so as to pass the same color filters simultaneously in front of the camera and picture tube, are well known to the art and will not be detailed here. For additional information on a suitable system, reference may be made to Patent 2,480,571, issued Aug. 30, 1949, to P. C. Goldmark. A suitable design of color disk may also be that shown in Patent 2,304,081, issued December 8, 1942, to P. C. Goldmark, in which the disk is divided into a plurality of sectoral color filters of the proper primary colors; green, red-orange, and blue-violet (commonly referred to as green, red, and blue).

In the field sequential type of color television system one of the most serious limitations is that imposed by color flicker. If the rotating color disks are merely applied to a transmitter and receiver utilizing standard 525-line, 30-frame, double-interlaced transmission, the complete cycle for sequential transmission of all three colored images requires $\frac{1}{10}$ of a second. In an effort to reduce flicker, a double-interlaced system has been proposed, utilizing 405 horizontal scanning lines instead of 525-lines, and utilizing 144 picture fields per second instead of 60 fields per second. With this modified system, the horizontal resolution is theoretically reduced to about half of the horizontal resolution obtainable in a conventional monochrome receiver. In any event, the application of the principles of my invention can result in an improvement in horizontal resolution of approximately 50%, which is a very significant improvement and particularly valuable in this field sequential type of color system. Furthermore, this improvement in resolution applies to the full frequency range of each of the three component color signals. It is not necessary to transmit the higher frequency video components by the so-called "mixed highs" technique in order to obtain adequate resolution, as has previously been proposed. This technique involves transmitting higher frequency picture components as a single monochrome signal, as is more particularly explained in my aforesaid copending application, Serial No. 176,405 of July 28, 1950.

In the modified system of transmission and reception utilizing the rotating color disks of Figs. 1*a* and 3*a*, the same frequencies may be employed in the various elements of the system as shown in Figs. 1 and 3 for monochrome transmission and reception. However, if it is desired to operate with the 405-line, 144-field, double-interlaced, color system, it is merely necessary to make the following modifications:

(1) The frequency of master oscillator 34 of Fig. 1 may conveniently be chosen as 6.6339 mc. p. s., since the line scanning frequency in this system is 29,160 c. p. s. This is the 455th harmonic of one-half the line scanning frequency. Of course, other suitable odd multiples of one-half the line scanning frequency may be selected, but this harmonic is convenient because its factors are $5\times7\times13$, which are particularly suitable for the frequency dividers 39 and 51.

(2) The frequency divider 39 will then yield 3.31695 mc. p. s., and the frequency divider 51 will have a 455/1 division ratio, yielding 7,290 c. p. s. (which is ¼ the line scanning frequency).

(3) The frequency multiplier 52 again multiples this last frequency by a factor of 8, yielding twice the line frequency, or 58.32 kc. p. s., which is suitable for synchronizing the master pulse generator 50.

(4) The pulse generator 50 supplies 144-c. p. s. pulses to the square wave generator 54, which in turn generates 72-c. p. s. keying waves for application to the keyed amplifiers 31 and 41.

(5) The receiver of Fig. 3 requires no substantial modification except to tune the narrow band pass filter 95 to the retransposing frequency of 3.31695 mc. p. s. and to tune the amplifier and doubler 96 accordingly. The keying waves supplied over conductor 99 will automatically have the required 72-c. p. s. pulse frequency.

(6) The color disks in the transmitter and receiver may conveniently be so synchronized with the keying of the "highs" and the "super-highs" that the sequence of color information transmission is as follows:

| In Field | Data Transmitted |
|---|---|
| #1 | Green "lows" and green "highs." |
| #2 | Red "lows" and red "super-highs." |
| #3 | Blue "lows" and blue "highs." |
| #4 | Green "lows" and green "super-highs." |
| #5 | Red "lows" and red "highs." |
| #6 | Blue "lows" and blue "super-highs." |

As pointed out in connection with the monochrome systems previously described, the cut-off frequencies of the band pass filters which select bands A, B, and C may be varied over considerable limits to achieve the most desirable compromise between maximum picture definition and freedom from flicker effects. For the particular color system just described above, the following frequencies might optionally be selected for the three frequency bands:

| | Mc. p. s. |
|---|---|
| Band A | 0–1.3 |
| Band B | 1.0–3.8 |
| Band C | 3.3–5.3 |

It will also be readily understood by those skilled in the art that it may be necessary to include transmission delay lines, or equivalent time delay networks, in some of the transmitter and receiver channels for the component color signals, in order to equalize the delays in the signals passed through the several channels so as to provide correct time registry of colors in the reproduced picture image.

It will now be apparent that I have provided improved high definition television systems and methods, adaptable both to monochrome and color transmission, whose most significant advantages may be briefly summarized as follows:

(1) The picture detail is substantially increased for a given frequency bandwidth of transmission. The theoretical limit of improvement is twice the bandwidth of the transmission channel, or 100% (with band A reduced to zero bandwidth with bands B and C each occupying the entire channel width). However, in the interest of compatibility with existing receivers and reduction of flicker effects, it is preferred to transmit some of the "lows" continuously. The upper frequency limits for these "lows" need normally not exceed about 2.0 mc. p. s., which still permits a very substantial improvement in definition of the order of 50%.

(2) All precision equipment is localized at the transmitter so that the receiver can be relatively low in cost, reliable in operation, easy to adjust and maintain, and simple in construction. By utilizing multi-purpose tubes wherever possible, only a few more tubes are required than in present-day monochrome receivers.

(3) The receiver is compatible with present monochrome standards, using the same field, frame, and line scanning rates.

(4) The resultant high-definition picture has excellent "texture" in the sense that no "dot" structure is visible. This is a distinct advantage over previous systems of the so-called "dot sequential" type which involve complex pulse-multiplexing techniques wherein the picture elements or "dots" are required to be sampled at an extremely high rate and with extreme precision. My system also avoids objectionable optical effects often observed in such systems, such as the effects commonly known as "twinkle" or "crawl."

While certain specific embodiments of my invention have been shown and described, it will, of course, be understood that various other modifications may be made without departing from the principles of the invention. The appended claims are, therefore, intended to cover any such modifications within the true spirit and scope of the invention.

What I claim as new and desire to secure by Letters Patent of the United States is:

1. In the art of picture facsimile transmission and reception, the method of operation which comprises scanning a picture scene and developing therefrom a periodic electrical facsimile signal including frequency components extending over a relatively wide band and up to a relatively high frequency corresponding to very fine picture detail in said scene, segregating said components into three substantially complementary sub-bands respectively comprising the relatively low frequency, medium frequency, and high frequency components of said signal, transposing said high frequency components to form a fourth sub-band comprising corresponding components of medium frequencies, transmitting said low frequency components, alternately transmitting said medium frequency components and said transposed high frequency components in predetermined time sequence, receiving said transmitted low frequency, medium frequency, and high frequency components, retransposing said fourth sub-band into said sub-band comprising high frequency components, and utilizing said three complementary sub-bands in recreating an image of said scene.

2. In the art of transmitting and receiving a periodic succession of television picture signals produced by scanning at least one complete picture field and including a band of frequency components extending up to a high video frequency through a signal transmission channel capable of passing a band of frequencies only up to a relatively lower video frequency, the method comprising the steps of subdividing each said signal into first, second, and third substantially complementary sub-bands, said third sub-band comprising frequency components between said lower frequency and said high frequency and having a band width not substantially exceeding the band width of said second sub-band, said first, second and third sub-bands respectively comprising the relatively low frequency, medium frequency, and high frequency components of said signal, transposing said third band downward in frequency to produce a fourth sub-band lying within said second band, transmitting said first sub-band through said channel during periodic consecutive time intervals coinciding with said complete picture fields, transmitting said second sub-band through said channel during periodic non-consecutive time intervals coinciding with certain of said complete picture fields, transmitting said fourth sub-band during the intervening time intervals, receiving said signals from said channel, retransposing said fourth sub-band into said third sub-band, recreating consecutive partial picture images respectively including the video information in said first and second and in said first and third sub-bands, and presenting said partial images in optically superimposed relation for viewing.

3. In the art of picture facsimile transmission, the method which comprises the steps of generating a periodic picture signal representative of the scanning of a scene and including frequency components extending over a predetermined frequency band, segregating said components into three substantially complementary sub-bands respectively comprising the relatively low-frequency, medium-frequency, and high-frequency components of said signal, transposing said high-frequency components to form a fourth sub-band comprising corresponding components of medium frequencies, transmitting said low-frequency components, and alternately transmitting said medium-frequency components and said transposed high-frequency components in predetermined time sequence.

4. In the art of picture facsimile transmission, the method which comprises the steps of generating a periodic picture signal representative of the scanning of a scene and including frequency components extending over a predetermined frequency band, segregating said components into three substantially complementary sub-bands respectively comprising the relatively low-frequency, medium, frequency, and high-frequency components of said signal, said high-frequency sub-band having a band-width not substantially exceeding the band-width of said medium-frequency sub-band, transposing said high-frequency components to form a fourth sub-band lying within said medium-frequency band, transmitting said low frequency components through a transmission channel capable of passing low-frequency and medium-frequency components, and alternately transmitting said medium-frequency components and said transposed high-frequency components in predetermined time sequence through said channel.

5. A picture facsimile transmitter comprising camera means for scanning a picture scene in a predetermined sequence and for generating a periodic picture signal corresponding to the details of said scene, said signal including frequency components extending over a predetermined frequency band, electrical filter means for separating said components into three substantially-complementary sub-bands respectively comprising the relatively low-frequency, medium-frequency, and high-frequency components of said signal, heterodyne conversion means for transposing said high-frequency components to form a fourth sub-band comprising corresponding components of medium frequencies, means for transmitting said low-frequency components, and keying means synchronized with said camera means for alternately transmitting said medium-frequency components and said transposed-high-frequency components in a predetermined time sequence synchronized with the scanning of said scene.

6. In a television transmission system, means for generating a periodic train of high definition video signals in response to the field-sequential scanning of a scene, each of said signals including a band of components extending up to a super-high video frequency, means comprising a plurality of band-pass filters for subdividing the video frequency components of said signals into three substantially-contiguous frequency bands, namely a low band, a high band and a super-high band, the adjoining cut-off frequencies for said high and super-high bands being selected to be substantially equal to a desired cut-off frequency of transmission and the adjoining cut-off frequencies for said low and high bands being selected to make the bandwidth of said high band at least as great as that of said super-high band, means for transposing the frequency components of said super-high band into a fourth band lying within said high band, means for supplying the frequency components of said low band and said high band to a transmission channel during periodic, non-consecutive time intervals each equal to a predetermined integral multiple, including unity, of a complete picture field, and means for supplying the frequency components of said low band and said fourth band to said channel during the intervening time intervals.

7. A system for transmitting a succession of high definition television picture signals, each produced by scanning a picture field at a predetermined line-scanning frequency and each containing a wide band of video components extending substantially from zero frequency up to a super-high video frequency, comprising three electrical filter networks energized in parallel from said signals, said filter networks respectively passing three substantially-complementary bands of frequencies, said first filter passing a low band extending from zero to a low video frequency, said second filter passing a high band extending from said low frequency to a selected high video frequency, and said third filter passing a super-high band extending from said high frequency to said super-high video frequency, said super-high band having a width not substantially exceeding the width of said high band, means for generating a sub-carrier frequency selected to differ from any frequency within said super-high band by a frequency lying within said high band, means for mixing the frequencies of said super-high band with said sub-carrier frequency and selecting a transposed super-high band lying substantially within the same frequency range as said high band, means for generating a carrier wave, means for modulating said low band upon said wave during consecutive fields, means for additionally modulating said high band upon said wave during regularly-recurring, non-consecutive time intervals coinciding with certain of said picture fields, and means for additionally modulating said transposed super-high band upon said wave during the intervening time intervals coinciding with the remaining picture fields.

8. A television transmitting system as defined in claim 7, wherein said sub-carrier frequency is further selected to be substantially equal to an odd integral multiple of one-half the line scanning frequency.

9. In a high definition television transmitting system, means including a television camera for scanning a scene and for developing a corresponding train of periodic video signals, said signals each including frequency components extending up to a predetermined high video frequency, means comprising three band-pass filters for subdividing said signals into three substantially-contiguous frequency bands extending up to said frequency, namely a low-frequency band A, a medium-frequency band B and a high-frequency band C, said band B having a bandwidth at least equal to that of band C, means for generating a particular subcarrier frequency differing from the frequencies of band C by frequencies lying within band B, means for mixing the frequencies of band C with said subcarrier frequency and for selecting the difference-frequency side band C', a carrier wave modulator, means for supplying the frequencies of band A continuously to said modulator, a pair of keyed amplifiers, means for supplying the frequencies of bands B and C' to said modulator through said respective amplifiers, and means for keying said amplifiers on and off in alternate succession in synchronism with the scanning of said scene.

10. In a high definition television transmitting system, means including a television camera for scanning a scene and for developing a corresponding train of periodic video signals, said signals each including frequency components extending up to a predetermined high video frequency, means comprising three band-pass filters for subdividing said signals into three substantially-contiguous frequency bands extending up to said frequency, namely a low-frequency band A, a medium-frequency band B and a high-frequency band C, said band B having a bandwidth at least equal to that of band C, means for generating a particular frequency differing from the frequencies of band C by frequencies lying within band B, means for mixing the frequencies of band C with said particular frequency and for selecting the difference-frequency side band C', means for producing a sub-carrier frequency related to said particular frequency by an integral ratio and lying within the limits of band B, a carrier wave modulator, means for supplying the frequencies of band A continuously to said modulator, a pair of keyed amplifiers, means for supplying the frequencies of bands B and C' to said modulator through said respective amplifiers, means for also supplying said sub-carrier frequency to said modulator through one of said amplifiers, means for keying said amplifiers on and off in alternate succession in synchronism with the scanning of said scene, means for generating a carrier wave, and means for modulating said carrier wave in accordance with the output of said modulator.

11. In a high definition facsimile transmitting system, means for recurrently scanning a scene in a predetermined sequence and for developing a corresponding train of periodic picture signals, said signals each including frequency components extending up to a predetermined high frequency, means for subdividing said signals into three substantially-contiguous frequency bands extending up to said high frequency, namely a low-frequency band A, a medium-frequency band B and a high-frequency band C, said band B having a bandwidth at least equal to that of band C, means for generating a wave of a particular frequency differing from the frequencies of band C by frequencies lying within band B, means for mixing the signals of band C with said wave and for selecting the difference-frequency of side band C', means for producing a subcarrier wave of a frequency related to said particular frequency by an integral ratio and lying within the limits of band B, means for generating and transmitting a carrier wave, means for modulating the signals of band A continuously on said carrier wave, keying means for alternately modulating the signals of band C' on said carrier wave in synchronism with said scanning sequence, and means for additionally modulating said subcarrier wave on said carrier wave.

12. A facsimile transmitting system as defined in claim 11, wherein said scene is scanned in a succession of scanning lines at a predetermined line-scanning frequency and wherein said particular frequency is equal to an odd integral multiple of one-half the line-scanning frequency.

13. In a high definition television transmitting system, means including a television camera for effecting field-sequential scanning of a scene at predetermined line and field frequencies and for developing a corresponding train of periodic video signals, said signals each including frequency components extending up to a predetermined high video frequency, electrical filter means for subdividing said signals into three substantially-contiguous frequency bands extending up to said frequency, namely a low-frequency band A, a medium-frequency band B and a high-frequency band C, said band B having a bandwidth somewhat greater than that of band C, local oscillator means for generating a wave of a particular frequency selected to differ from the frequencies of band C by frequencies lying within band B, means for mixing the signals of band C with said wave and for selecting the difference-frequency side band C', means for producing a subcarrier wave of a frequency related to said particular frequency by an integral ratio and lying within the limits of band B, means for generating and transmitting a carrier wave, means for modulating the signals of band A continuously on said carrier wave, means for alternately modulating the signals of band B and band C' on said carrier wave during interlaced time intervals each coinciding in duration with a predetermined integral number of picture fields, and means for additionally modulating said subcarrier wave on said carrier wave only during those alternate ones of said time intervals when the signals of band C′ are modulated on said carrier wave.

14. A transmitting system as defined in claim 13, wherein said particular frequency is also selected to be equal to an odd integral multiple of the line scanning frequency and wherein said subcarrier frequency lies within band B but outside band C′.

15. In a high definition television transmission system, camera means for effecting field-sequential scanning of a scene at predetermined line and field frequencies and for generating a periodic train of high definition video signals, each of said signals including a band of components extending up to a super-high video frequency, means for subdividing the video frequency components of said signals into three substantially contiguous frequency bands, namely a low band, a high band and a super-high band, the adjoining cut-off frequencies for said high and super-high bands being selected to be substantially equal to a desired cut-off frequency of transmission and the adjoining cut-off frequencies for said low and high bands being selected to make the bandwidth of said high band greater than that of said super-high band, means for generating a local signal having a particular frequency selected to differ from all frequencies in said super-high band by frequencies lying within said high band, said particular frequency being further selected to differ from an odd integral multiple of the line scanning frequency, means utilizing said local signal for transposing the frequency components of said super-high band into a fourth band lying within said high band, means for generating a subcarrier wave having a frequency related to said particular frequency by an integral ratio and lying within the limits of said high band but outside said fourth band, means for supplying the frequency components of said low band and of said high band to a transmission channel during periodic, non-consecutive time intervals each equal to a predetermined integral multiple, including unity, of a complete picture field, and means for supplying the frequency components of said low band and said fourth band and also said subcarrier wave to said channel during the intervening time intervals.

16. A facsimile receiver adapted to receive the modulated carrier wave from the transmitter of claim 5, comprising means for demodulating the received wave, first, second and third filter networks arranged for respectively selecting the bands of low-frequency, medium-frequency, and transposed-high frequency components of the demodulated signal, means for impressing the demodulated wave on said three networks in parallel, a heterodyne mixer, means energizing said mixer from said third network, means comprising said mixer for reproducing said high-frequency components, a cathode ray picture tube having an intensity control electrode, means coupling the output of said first filter network to said control electrode, a pair of keyed amplifiers, means comprising said amplifiers for individually coupling the outputs of said second filter network and of said mixer to said control electrode, means for deriving synchronizing potentials from said received wave corresponding to the alternations in said medium-frequency and transposed-high-frequency components, and keying means controlled by said potentials for rendering said amplifiers alternately conductive in synchronism with the transmitter keying means.

17. A television receiver adapted to receive the modulated carrier wave from the transmitter of claim 11, comprising means for demodulating the received carrier wave to reproduce the modulation signals, band-pass filter means for respectively selecting signals within bands A, B and C′, narrow-band filter means energized by the selected signals within band B for selecting said subcarrier signal, a heterodyne mixer, means for energizing said mixer by said subcarrier signal and by the selected signals within band C′, means comprising said mixer for reproducing the signals of band C, a cathode ray picture tube having a control electrode, means for impressing the selected signals of band A on said electrode, a pair of keyed amplifiers, means comprising said amplifiers for individually impressing the selected signals of band B and the reproduced signals of band C on said electrode, means for deriving synchronizing potentials from said received wave corresponding to the alternations in the signals of said bands B and C′, and keying means controlled by said potentials for alternately keying said amplifiers on and off in synchronism with the alternate modulation of the signals of bands B and C′ on said carrier wave.

18. A facsimile receiver adapted to receive the modulated carrier wave from the transmitter of claim11, comprising means for demodulating the received carrier wave to reproduce the modulation signals, a group of first, second and third band-pass filters respectively arranged to select signals within bands A, B and C′, means for supplying said signals to all three filters in parallel, means comprising a fourth filter sharply tuned to said subcarrier frequency for selecting said subcarrier wave from said signals, a mixer, means for energizing said mixer from said third and fourth filters, means comprising said mixer for retransposing the signals of band C′ into band C, a cathode ray picture tube having an intensity control electrode, first, second, and third, parallel signal channels connected respectively to said filters, means comprising said three signal channels for respectively supplying signals from said first filter, said second filter and said frequency-conversion means to said electrode, said second and third channels each including a device adapted to be keyed on or off, means for deriving synchronizing potentials from said received wave corresponding to the alternations in the signals of said bands B and C′, and keying means controlled by said potentials for keying said devices alternately on and off in proper sequence to supply the signals of bands B and C to said electrode.

19. A facsimile receiver adapted to receive the modulated carrier wave from the transmitter of claim 13, comprising means for demodulating the received carrier wave to reproduce the modulation signals, first and second filter means for respectively selecting signals lying within bands A and B, third filter means for sharply selecting said subcarrier wave, a heterodyne mixer, means for energizing said mixer with said subcarrier wave and with received signals lying within band B, means comprising said mixer for reproducing selected signals within band C whenever said subcarrier wave is present, a cathode ray picture tube having an intensity control electrode, first, second and third, parallel signal channels connected respectively to said filter means, means comprising said three signal channels for respectively impressing said selected signals within bands A, B and C on said electrode, means for developing synchronizing potentials in response to receipt of said subcarrier wave, and keying means controlled by said synchronizing potentials for blocking said second signal channel when said subcarrier is present.

20. A facsimile receiver adapted to receive the modulated carrier wave from the transmitter of claim 11, comprising means for demodulating the received wave to reproduce the modulating signals, filter means for respectively selecting signals lying within bands A and B, additional sharply-selective filter means for selecting said subcarrier wave, a heterodyne mixer, means for energizing said mixer in response to said subcarrier wave and received signals within band B, means comprising said mixer for reproducing selected signals of band C when band C′ is received, a cathode ray picture tube having an intensity control electrode, means comprising first, second and third picture channels for respectively impressing said selected signals within bands A, B and C on said electrode, means for deriving synchronizing potentials from said received wave corresponding to the alternations in the signals of said bands B and C′, and keying means controlled by said potentials for blocking said second signal channel when the signals of band C′ are received.

21. A television receiver for receiving a carrier having modulated thereon a video signal comprising three respective bands of low frequency, intermediate frequency and high frequency video signal components in which the intermediate frequency and high frequency bands are alternately transmitted with the high frequency band transposed to lie within the intermediate frequency band, which receiver comprises means for demodulating the received waves, means comprising filter networks for respectively selecting signal components within said bands, a heterodyne mixer, means energizing said mixer with received components of said high frequency band, means comprising said mixer for retransposing said high frequency components, a cathode ray picture tube having an intensity control electrode, first, second and third parallel signal channels means for impressing said demodulated waves on said three signal channels, means comprising said channels for respectively impressing said received low frequency, intermediate frequency and retransposed high frequency components on said electrode, means for deriving synchronizing potentials from said video signal corresponding to the alternations in said intermediate frequency and high frequency bands, and keying means controlled by said potentials for rendering said second and third signal channels alternately operative.

References Cited in the file of this patent

UNITED STATES PATENTS

| Number | Name | Date |
|---|---|---|
| 1,769,918 | Gray | July 8, 1930 |
| 1,769,919 | Gray | July 8, 1930 |
| 1,769,920 | Gray | July 8, 1930 |
| 1,775,241 | Horton | Sept. 9, 1930 |
| 1,812,405 | Ives | June 30, 1931 |
| 2,095,050 | Beverage | Oct. 5, 1937 |
| 2,236,502 | Goldsmith | Apr. 1, 1941 |

FOREIGN PATENTS

| Number | Country | Date |
|---|---|---|
| 460,127 | Great Britain | Jan. 21, 1937 |